Aug. 25, 1964
A. NEUKOM
3,145,627
CONTROL APPARATUS FOR WELDING MACHINES AND THE LIKE
Filed Oct. 24, 1961
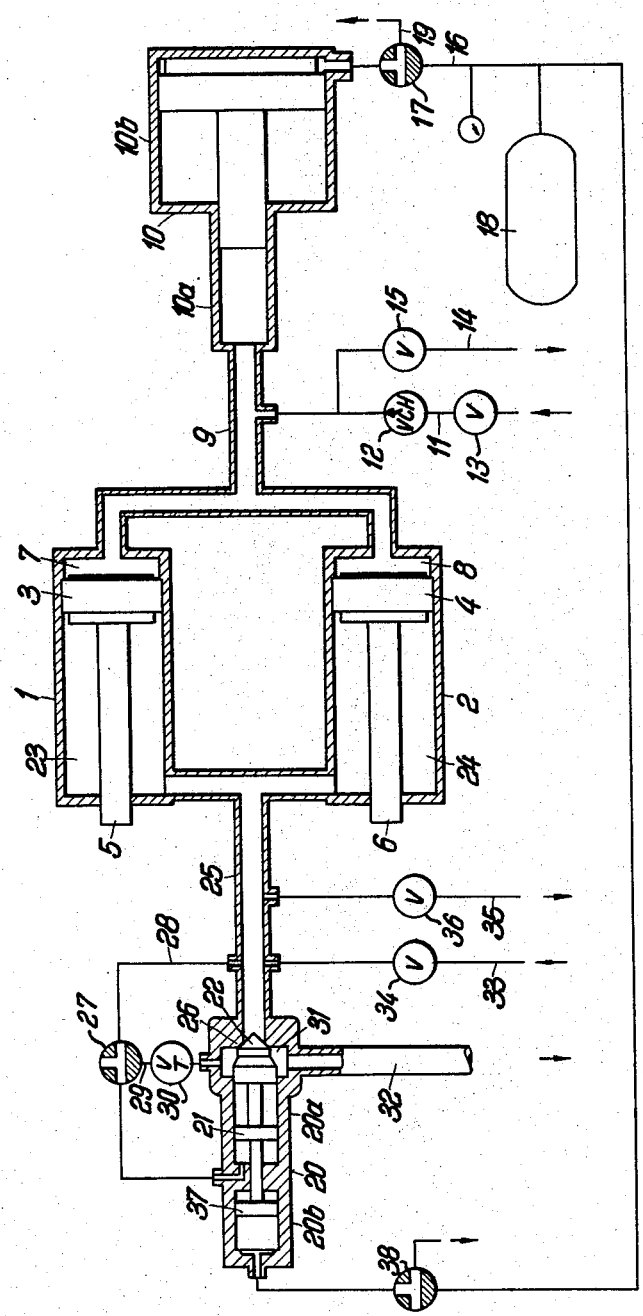
Inventor:
Alfred Neukom
by Michael S. Striker
Attorney United States Patent Office 3,145,627
Patented Aug. 25, 1964

3,145,627
CONTROL APPARATUS FOR WELDING
MACHINES AND THE LIKE
Alfred Neukom, Dubendorf, Zurich, Switzerland, assignor to H. A. Schlatter A.G., Zollikon, Zurich, Switzerland
Filed Oct. 24, 1961, Ser. No. 147,314
Claims priority, application Switzerland Oct. 26, 1960
6 Claims. (Cl. 91—442)

The present invention relates to control apparatus particularly adapted for use with a machine, such as a welding machine, which requires the work to be initially fed at a relatively slow rate and then to be fed at a high rate.

In resistance welding machines, for example, the workpieces which are to be butt welded are first brought with a relatively slow rate of speed into proximity to provide between the ends which are to be welded a flash resulting from the flow of electrical current through the workpieces and the resistances thereof so that the ends, with or without preheating, become very hot and in fact even will be burned away to some extent, and then when the metal ends reach the required degree of plasticity, the workpieces are suddenly thrust against each other with quite a high pressure and requiring suddenly a much higher rate of feed so as to press the ends of the workpieces against each other upsetting these ends while they become fused together.

At the present time the rapid feed of the type referred to above is brought about by magnetically-operated valves which do not provide the sudden increase in the speed of feed to the required degree.

It is a primary object of the present invention to provide a control apparatus of the above type capable of providing very suddenly a sharp increase in the rate of feed so that a sudden thrust of the type referred to above can be obtained to a far greater degree than has been heretofore possible with the prior art.

Another object of the present invention is to provide for a control apparatus of the above type a valve controlling structure which is very reliable while requiring a minimum amount of structure and which at the same time will provide a sudden opening of a path of very small resistance to fluid flow so that an extremely increased rate of feed can be obtained with this structure.

Still another object of the present invention is to provide a structure of the above type with a valve control which relies for operation of the valve solely on the pressure of the hydraulic fluid itself and does not require any special springs, magnetic coils, or the like, so that the structure is extremely simple and at the same time very reliable.

Still another object of the present invention is to provide a structure of the above type capable of controlling the rate of increase in the speed of the feed.

Also it is an object of the present invention to provide a structure which combines hydraulic and pneumatic apparatus to participate in the controls.

With the above objects in view the invention includes, in a control apparatus for a machine, such as a welding machine, requiring initially a relatively slow feed and then a sudden relatively rapid feed, a working cylinder and piston means made up of at least one cylinder member and one piston member slidable therein, these members defining a working chamber which receives a fluid under pressure to advance one of the members with respect to the other along a working stroke and these members also define with each other a return chamber which receives fluid under pressure to return the said one member with respect to the other member to a predetermined starting position. A low pressure discharge conduit means and a high pressure discharge conduit means respectively communicate with this return chamber of the working cylinder and piston means, so that when this return chamber communicates with the high pressure discharge conduit means the movement of the said one member of the cylinder piston means with respect to the other will be at a relatively slow rate when fluid under pressure is supplied to the working chamber, while when the return chamber communicates with the low pressure discharge conduit means the movement of this one member will be at a much greater rate. A valve means is provided to control the communication between the return chamber and the low pressure discharge conduit means, this valve means being movable between a closed and an open position and this valve means having a predetermined effective area acted upon by the fluid under pressure and the return chamber to urge the valve means from its closed toward its open position. A control cylinder and piston means cooperates with the valve means to control the latter, and this control cylinder and piston means includes also a cylinder member and a piston member, these members defining a working chamber which receives a fluid under pressure, and this working chamber also communicates with the return chamber of the working cylinder and piston means so that the fluid under pressure in the working chamber of the control cylinder and piston means is at the same pressure as the fluid in the return chamber of the working cylinder and piston means, and the effective area of the control cylinder and piston means is greater than the predetermined effective area of the valve means so that in this way the fluid under pressure itself acts to maintain the valve means in its closed position. A means communicates with the working chamber of the control cylinder and piston means for placing the latter in communication with the low pressure discharge conduit means so as to relieve the pressure in the working chamber of the control cylinder and piston means and thus release the valve means to the pressure of the fluid in the return chamber so that this latter fluid will suddenly move the valve means to its open position suddenly reducing the pressure in the return chamber so that the pressure in the working chamber of the working cylinder and piston means will be effective to very suddenly and rapidly move the said one member of the working cylinder and piston means at a much greater rate when the return chamber thereof communicated only with the high pressure discharge conduit means.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings in which the structure of the invention is diagrammatically illustrated.

Referring now to the drawing, there is shown therein a working cylinder and piston means made up in the illustrated example of a pair of cylinders 1 and 2 and a pair of pistons 3 and 4 respectively slidable therein, although only one cylinder member and one piston member may be provided for the working cylinder and piston means. The piston member 3 and the cylinder 1 define a working chamber 7 and a return chamber 23, a piston rod 5 being fixed to the piston member 3 and extending therefrom to the exterior of the cylinder 1. In the same way the piston member 4 and the cylinder member 2 define a working chamber 8 and a return chamber 24, and the piston 4 is fixed to a piston rod 6 which extends to the exterior of the cylinder 2, as illustrated in the drawing. These piston rods 5 and 6 are connected in a well known manner with the carriage of the machine which carries the movable workpiece which is held on the carriage and which moves therewith into engagement with the stationary workpiece, as is well known in the art, during the welding process.

The working chambers 7 and 8 of the cylinders 1 and 2, respectively, communicate with a conduit 9 which in turn communicates with the high-pressure cylinder portion 10a of a control cylinder 10 which includes in addition a low-pressure cylinder portion 10b. A hydraulic fluid such as oil is supplied to the conduit 9 through the conduit 11 which is provided with a non-return valve 12 as well as with an adjustable valve 13, the valve 12 preventing fluid from flowing from the valve 12 toward the valve 13 but permitting fluid to flow from the valve 13 toward the valve 12, as indicated by the arrow in the drawing. Thus, fluid can flow along the conduit 11 only toward the conduit 9 upstream of the valve 12. Fluid may discharge from the conduit 9 through the discharge conduit 14 which communicates with the conduit 11 upstream of the valve 12, and the conduit 14 carries an adjustable valve 15 which may be opened or closed for a purpose described below. A conduit 16 is located in the pneumatic circuit of the structure shown in the drawing, and the conduit 16 carries a valve 17 which is adapted to place the working chamber of the cylinder 10b, at the right of the piston therein as viewed in the drawing, either in communication with a container 18 of compressed air or in communication with the outer atmosphere through the discharge tube 19. Any compressor or the like communicates with the tank 18 to maintain therein air at a desired pressure.

In addition to the above-described working cylinder and piston means, the structure of the invention includes a control cylinder and piston means 20, and this control cylinder and piston means 20 includes the cylinder portions 20a and 20b, the cylinder 20b also forming part of the pneumatic circuit while the cylinder 20a forms part of the hydraulic circuit. The control cylinder and piston means includes in addition to the cylinder portion 20a a piston member 21 slidable therein and this piston 21 defines with the cylinder 20a a working chamber located at the left side of the piston 21 in the cylinder 20a, as viewed in the drawing. The control cylinder and piston means is operatively connected to a valve means 22 for controlling this valve means, and it will be noted that the piston 21 is connected directly to and is coaxial with the movable valve member of the valve means 22. This valve member is conical and engages a valve seat 26 in its closed position shown in the drawing. The return chambers 23 and 24 communicate through a conduit 25 on the one hand with a high pressure discharge conduit means 35 which can be controlled by adjustment of the valve 36 and on the other hand with a low pressure discharge conduit means 32 which is in the form of a tube of relatively large diameter providing no appreciable resistance to the flow of fluid from the return chamber 23 and 24 when the valve 22 is placed in an open position displaced to the left from the closed position thereof shown in the drawing. It will be noted that the conduit 25 is coaxial with the control cylinder 20a and leads into a relatively large chamber 31 surrounding the valve member of the valve means 22 and communicating with the low pressure discharge conduit means 32. Thus, when the valve means 22 is in its open position the relatively large conduit 25 will communicate through the relatively large chamber 31 with the relatively large low pressure discharge conduit 32, so that there will be very little resistance to flow of fluid from the return chambers 23 and 24. The valve seat 26 is located at the junction between the conduit 25 and the chamber 31.

The working chamber of the cylinder 20a to the left of the piston 21 therein as viewed in the drawing, communicates through a conduit 28 with the discharge condit 25 at a location upstream of the valve means 22, and this conduit 28 carries a three-way valve 27 which in one position places the working chamber of the cylinder 20a in communication with the conduit 25 and which in another position places this latter working chamber in communication with the conduit 29 which leads through an adjustable throttling valve 30 to the chamber 31 which communicates with the low pressure discharge conduit means 32. A conduit 33 for supplying hydraulic fluid under pressure communicates with the conduit 25 and is provided with an adjustable valve 34.

The cylinder 20b has a piston 37 slidable therein and fixed coaxially to the piston 31, as shown in the drawing, and the chamber in the cylinder 20b which is located to the left of the piston 37, as viewed in the drawing, communicates through a valve 38 with the tank 18 of compressed air. This valve 38 is similar to the valve 17 and may be adjusted either to place the interior of the cylinder 20b, to the left of the piston 37 therein, as viewed in the drawing, in communication with the tank 18 or in communication with the outer atmosphere.

The effective area in the working chamber of the cylinder 20a, which is to say the area of the piston 21 less the area of the piston rod connected thereto, is greater than the effective area of the valve means 22, this latter effective area in the illustrated example being, for example, equal to the inner diameter of the conduit 25. The effective area of the valve means 22 is determined by the inner diameter of the valve seat 26, and this latter effective area is maintained, in accordance with the present invention, smaller than the effective area of the working chamber of the cylinder means 21, 20a.

The conduits 25 and 32 have a relatively large cross-sectional interior area, as was pointed out above, so that during the upsetting stage of the welding process there will be a sudden rapid discharge of fluid from the working chambers 23 and 24 enabling the fluid under pressure in the working chambers 7 and 8 to move the piston 3 and 4 quite rapidly and with a considerable pressure along their working strokes.

The conduits 14, 32, and 35 all discharge into a common reservoir for the hydraulic liquid such as oil or the like, and through a suitable pumping means this hydraulic fluid is pumped under pressure into the conduits 33 and 11.

The several valves 13, 15, 17, 27, 34, 36, and 38 are all magnetically actuated, and the coils of these valves are electrically connected in an unillustrated control circuit which provides the desired sequence of operations in an automatic and well known manner. Of course, with the three-way valves 27, 38 and 17, there are only two positions and when two of the passages are interconnected in one position of these valves the other of the passages closes. Thus, when, for example, the working chamber of the cylinder 20b is placed in communication with the outer atmosphere to the valve 38, the tank 18 is cut off by the valve 38 from the outer atmosphere as well as from the working chamber of the cylinder 20b.

When the welding machine is ready to carry through a cycle of operations, the working chamber of the high pressure cylinder 10a, the working chambers 7 and 8, the return chambers 23 and 24, the working chamber of the cylinder 20a, and all of the conduits communicating with these chambers are filled with oil or other suitable hydraulic fluid. The valves 13 and 36 serve to control the speed of movement of the pistons 3 and 4 to the left, as viewed in the drawing, during the relatively slow rate of feed when the ends of the workpieces to be welded are being heated through their resistance and flashing and burning away, as described above. The adjustable throttle valve 30, which may have any conventional construction, serves to adjust the acceleration of the feed of the work when changing over from heating or burning of the ends of the workpieces to the upsetting stage during which the ends of the workpieces are pressed together so as to become fused.

At the beginning of an operating cycle the pistons 3 and 4 are in the illustrated position, and the same is true of pistons 21 and 37 as well as the valve means 22. Also, the piston of the cylinder 10 is at this time in the illustrated position where it is located at the right end of the stroke. In this initial position of the structure the valve 38 places the working chamber of the cylinder 20b, to the left of the piston 37 therein, in communication with the outer atmosphere, and at this time the valve 17 also places the interior of the cylinder 10b to the right of the piston therein in communication with the outer atmosphere. The valve 27 is in a position placing the working chamber of the cylinder 28 in communication with the discharge conduit 25. The valves 13, 15, and 34 are closed while the valve 36 is open.

In order to start the working cycle the valve 13 is opened so that fluid under pressure will be delivered to the conduit 9 to be supplied into the working chambers 7 and 8. Thus, the pistons 3 and 4 are advanced to the left, as viewed in the drawing, and the fluid in the return chambers 23 and 24 discharges through the high-pressure discharge conduit 35 which is controlled by the valve 36. This pressure in return chambers 23 and 24 of course acts on the valve means 22 to urge the latter to move from its illustrated closed position to its open position, but since through the conduit 28 and the valve 27 the same fluid at the same pressure acts in the working chamber of the cylinder 20a to urge the valve means 22 to its closed position, and since the effective working area of the working chamber of the cylinder 20a is greater than that of the valve means 22, this valve means 22 is maintained very reliably in its closed position irrespective of the magnitude of the pressure of the fluid in the conduit 25.

Inasmuch as the effective area in the working chamber of the cylinder 20a, to the left of the piston 21 therein, is larger than the effective area on which the pressure of the fluid in the discharge conduit 25 acts to urge the valve means 22 from its closed to its open position, the valve member of this valve means is urged against its seat 26 with a force which becomes greater as the pressure of the fluid increases, and therefore, even if the effective area of the valve means 22 is quite large, nevertheless even at relatively high fluid pressures the valve means 22 is reliably maintained in its closed position and prevents the fluid from reaching the low pressure discharge conduit 32. Thus, as long as the valve means 22 remains in its closed position, the oil or other hydraulic fluid moving out of the return chambers 23 and 24 during advance of the pistons 3 and 4 to the left, as viewed in the drawing, can only discharge through the conduit 35, and the flow of fluid therethrough is controlled by the valve 36. Thus, the speed of movement of the pistons 3 and 4 depends upon the adjustment of the valves 13 and 36 during the initial relatively slow rate of movement of the pistons 3 and 4.

In order to initiate the final stage of the welding process when the workpiece fed by the movement of the pistons 3 and 4 is suddenly pushed at a high rate of speed against the other workpiece so that their plastic ends become upset and fuse to each other, the valve means 17 is moved to a position which cuts off its communication with the outer atmosphere and instead places the interior of the cylinder 10b, to the right of the piston therein, as viewed in the drawing, in communication with the tank of compressed air 18. Thus, the piston assembly in the pressure-increasing unit 10 suddenly advances to the left, as viewed in the drawing, with the smaller piston of the device 10 displacing fluid under high pressure out of the cylinder 10a into the working chambers 7 and 8, and of course the non-return valve 12 suddenly closes so that the fluid displaced from the cylinder 10a must move into the working chambers 7 and 8 to provide a sudden thrust of the pistons 3 and 4 to the left, as viewed in the drawing. In addition to placing the valve 17, at this time, in the position which introduces compressed air from the tank 18 into the cylinder 10b, the valve 27 is placed into the position which cuts off communication between the working chamber of the cylinder 20a with the conduit 25 and instead places this working chamber through the conduit 29 in communication with the chamber 31 which communicates with the low pressure discharge conduit 32. In this way the working chamber of the cylinder 20a is suddenly relieved of pressure and the fluid in the discharge conduit 25 acts on the valve means 22 to suddenly and forcefully thrust this valve means to the left, as viewed in the drawing, to its open position placing the conduit 25 in communication with the low pressure discharge conduit 32. The relatively large chamber 31 places the conduits 25 and 32 in communication with each other in the manner which provides for discharge of the fluid from the return chambers 23 and 24 without any appreciable pressure so that the movement of the pistons 3 and 4 to the left by the sudden increase of the pressure in the working chambers 7 and 8 is not resisted to any appreciable degree by pressure in the return chambers 23 and 24, and thus there is a sudden sharp increase in the acceleration of the pistons 3 and 4 to produce the desired thrust on the workpiece to push the same against the other workpiece to which it is to be welded, and the extent of the acceleration of the pistons 3 and 4 can be controlled by the adjustment of the throttle means 30, since in this way the extent to which the working chamber of the cylinder 20a is relieved of pressure can be regulated.

It is to be noted that the valve means 22 is maintained in its closed position during the initial stage of the welding process by the pressure of the hydraulic fluid itself, and the valve means 22, in order to initiate the final upsetting stage of the welding process, is thrust to its open position also by the pressure of the hydraulic fluid itself, so that with a minimum amount of structure and technical difficulty, even when operating at relatively high fluid pressures, a complete shutting of the valve means 22 and a sudden wide opening thereof is obtained in the simplest possible manner. The force which maintains the valve means in its closed position and the force which opens the valve means is automatically adapted to the pressure of the hydraulic fluid.

After an operating cycle has been completed, the valves 17 and 27 are returned to their starting position in which the interior of the cylinder portion 10b, to the right of the piston therein as viewed in the drawing, is placed in communication with the outer atmosphere and in which the working chamber of the cylinder 20a communicates with the conduit 25 through the conduit 28. The valves 13 and 36 are closed, and the valve 34 is opened. Moreover, by moving the valve 38 to the position where it provides communication between the interior of the cylinders 20b, to the left of the piston 37 therein as viewed in the drawing, and the tank 18, the pressure of the air in the tank 18 is applied for a short time to the piston 37 to urge it to the right, as viewed in the drawing, so that the valve means 22 is again moved to its closed position. The oil which flows through the conduit 33 into the conduit 25 when the valve 34 is opened flows into the return chambers 23 and 24 to urge the pistons 3 and 4 back to their starting positions, and at this time the valve 15 is opened so that oil or other hydraulic fluid may flow out of the working chambers 7 and 8, and at the same time the oil flows into the chamber 10a to fill the latter in the manner shown in the drawing, so that the structure again is set for the next operating cycle, and once the piston in the cylinder portion 20a reaches its end position shown in the drawing, the oil or other hydraulic fluid displaced by movement of the pistons 3 and 4 to the right to their starting position shown in the drawing flows out through the conduit 14.

It will be understood that each of the elements described above, or two or more together, may also find a useful application in other types of control apparatus differing from the types described above.

While the invention has been illustrated and described as embodied in control apparatus for welding machines and the like, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

Reference is made to U.S. Patent 2,187,452 showing a carriage which may be operated by a piston rod corresponding to the above mentioned piston rods 5 and 6.

The three-way valves 27, 38 and 17 may be similar to the three-way valve shown also in U.S. patent specification 2,187,452.

What is claimed as new and desired to be secured by Letters Patent is:

1. In a control apparatus adapted to be used in a machine, such as a welding machine, requiring first a relatively slow feed and then a sudden rapid feed, in combination, first piston-and-cylinder means including at least one piston member and at least one cylinder member defining with each other a working chamber adapted to receive fluid under pressure to move one of said members in a given directions with respect to the other of said members, and a return chamber adapted to receive fluid under pressure to return said one member with respect to said other member to a given starting position; high pressure discharge conduit means and low pressure discharge conduit means respectively communicating with said return chamber of said first cylinder-and-piston means, the fluid in said return chamber discharging at a relatively slow rate through said high pressure discharge conduit means during relatively slow advance of said one member when fluid under pressure is supplied to said working chamber and said one member advancing at a high rate of speed when said return chamber communicates with said low pressure discharge conduit means while fluid under pressure is supplied to said working chamber; valve means controlling the communication between said return chamber and said low pressure conduit means, said valve means when it is in a closed position cutting off communication between said low pressure conduit means and said return chamber and when it is in an open position providing communication between said return chamber and said low pressure condit means, the fluid under pressure in said return chamber urging said valve means to said open position thereof; second cylinder-and-piston means cooperating with said valve means and having a piston member and a cylinder member defining a working chamber, said second cylinder-and-piston means maintaining said valve means in said closed position thereof in opposition to the pressure in said return chamber when said working chamber of said second cylinder-and-piston means is provided with fluid under pressure; and means cooperating with said working chamber of said second cylinder-and-piston means for placing said latter working chamber at a relatively low pressure freeing said valve means for movement by the pressure in said return chamber suddenly to said open position where said return chamber then communicates with said low pressure discharge conduit means to provide a sudden rapid advance of said one member of said first cylinder-and-piston means.

2. In a control apparatus adapted to be used in a machine, such as a welding machine, requiring first a relatively slow feed and then a sudden rapid feed, in combination, first piston-and-cylinder means including at least one piston member and at least one cylinder member defining with each other a working chamber adapted to receive fluid under pressure to move one of said members in a given direction with respect to the other of said members, and a return chamber adapted to receive fluid under pressure to return said one member with respect to said other member to a given starting position; high pressure discharge conduit means and low pressure discharge conduit means respectively communicating with said return chamber of said first cylinder-and-piston means, the fluid in said return chamber discharging at a relatively slow rate through said high pressure discharge conduit means during relatively slow advance of said one member when fluid under pressure is supplied to said working chamber and said one member advancing at a high rate of speed when said return chamber communicates with said low pressure discharge conduit means while fluid under pressure is supplied to said working chamber; valve means controlling the communication between said return chamber and said low pressure conduit means, said valve means when it is in a closed position cutting off communication between said low pressure conduit means and said return chamber and when it is in an open position providing communication between said return chamber and said low pressure conduit means, the fluid under pressure in said return chamber urging said valve means to said open position thereof; second cylinder-and-pisotn means cooperating with said valve means and having a piston member and a cylinder member defining a working chamber, said second cylinder-and-piston means maintaining said valve means in said closed position thereof in opposition to the pressure in said return chamber when said working chamber of said second cylinder-and-piston means is provided with fluid under pressure; means cooperating with said working chamber of said second cylinder-and-piston means for placing said latter working chamber at a relatively low pressure freeing said valve means for movement by the pressure in said return chamber suddenly to said open position where said return chamber then communicates with said low pressure discharge conduit means to provide a sudden rapid advance of said one member of said first cylinder-and-piston means; and adjustable throttling means communicating with said working chamber of said second cylinder-and-piston means through the conduit which leads fluid out of the latter working chamber for controlling the speed of movement of said valve means from said closed to said open position thereof.

3. In a control apparatus for a machine, such as a welding machine, requiring first a relatively slow feed and then a rapid feed, in combination, first cylinder-and-piston means including at least one cylinder member and at least one piston mmeber slidable therein, said members defining a working chamber adapted to receive fluid under pressure to move one of said members with respect to the other of said members and said members also defining a return chamber adapted to receive fluid under pressure to return said one member with respect to the other of said members to a given starting position; high pressure discharge conduit means and low pressure discharge conduit means respectively communicating with said return chamber so that when fluid discharges from said return chamber through said high pressure discharge conduit means while fluid under pressure is applied to said working chamber said one member will move at a relatively slow rate of speed with respect to said other member while when said return chamber communicates with said low pressure discharge conduit means said one member will move at a relatively high rate of speed with respect to said other member while fluid under pressure is supplied to said working chamber; valve means controlling the communication between said low pressure discharge conduit means and said return chamber, said valve means having a closed position cutting off communication between said return chamber and said low pressure discharge conduit means and an open position providing free communication between said return chamber and said low pressure discharge conduit means, and said valve means having a first effective area acted upon by the pressure of the fluid in said return chamber for urging said valve means from said closed to said open position thereof; second cylinder-and-piston means including a cylinder member and a piston member therein, said latter members defining a working chamber having a second effective area greater than said first effective area; conduit means providing communication between said working chamber of said second cylinder-and-piston means and said return chamber at a point upstream of said valve means so that the pressure which urges said valve means to said open position also acts through said working chamber of said second cylinder-and-piston means on a greater effective area than that urging said valve means to said open position to miantain said valve means in said closed position; and means communicating with said working chamber of said second cylinder-and-piston means for placing said latter working chamber at a relatively low pressure freeing said valve means for movement by the pressure of the fluid in said return chamber to said open position placing said return chamber in communication with said low pressure discharge conduit means to provide a rapid movement of said one member with respect to said other member of said first cylinder-and-piston means while fluid under pressure is supplied to said working chamber thereof.

4. In a control apparatus adapted to be used in a machine, such as a welding machine, requiring first a relatively slow feed and then a sudden rapid feed, in combination, first piston-and-cylinder means including at least one piston member and at least one cylinder member defining with each other a working chamber adapted to receive fluid under pressure to move one of said members in a given direction with respect to the other of said members, and a return chamber adapted to receive fluid under pressure to return said one member with respect to said other member to a given starting position; high pressure discharge conduit means and low pressure discharge conduit means respectively communicating with said return chamber of said first cylinder-and-piston means, the fluid in said return chamber discharging at a relatively slow rate through said high pressure discharge conduit means during relatively slow advance of said one member when fluid under pressure is supplied to said working chamber and said one member advancing at a high rate of speed when said return chamber communicates with said low pressure discharge conduit means while fluid under pressure is supplied to said working chamber; valve means controlling the communication between said return chamber and said low pressure conduit means, said valve means when it is in a closed position cutting off communication between said low pressure conduit means and said return chamber and when it is in an open position providing communication between said return chamber and said low pressure conduit means, the fluid under pressure in said return chamber urging said valve means to said open position thereof; second cylinder-and-piston means cooperating with said valve means and having a piston member and a cylinder member defining a working chamber, said second cylinder-and-piston means maintaining said valve means in said closed position thereof in opposition to the pressure in said return chamber when said working chamber of said second cylinder-and-piston means is provided with fluid under pressure; means cooperating with said working chamber of said second cylinder-and-piston means for placing said latter working chamber at a relatively low pressure freeing said valve means for movement by the pressure in said return chamber suddenly to said open position where said return chamber then communicates with said low pressure discharge conduit means to provide a sudden rapid advance of said one member of said first cylinder-and-piston means; and pneumatic means cooperating with said second cylinder-and-piston means for acting through the latter on said valve means to urge said valve means to said closed position thereof.

5. In a control apparatus for a machine, such as a welding machine, requiring an initial relatively slow feed and then a sudden rapid feed, in combination, first cylinder and piston means including a cylinder member and a piston member slidable therein, said members defining a working chamber adapted to receive fluid under pressure to move one of said members in a given direction with respect to the other of said members, and said members defining a return chamber adapted to receive fluid under pressure to return said one member in an opposite direction with respect to said other member to a predetermined starting position; low pressure discharge conduit means and high pressure discharge conduit means respectively communicating with said return chamber; valve means cooperating with said low pressure discharge conduit means for cutting off communication therebetween and said return chamber when said valve means is in a closed position and for providing communication between said return chamber and said low pressure discharge conduit means when said valve means is in an open position, whereby when fluid under pressure is supplied to said working chamber and said valve means is in said closed position thereof said one member will move at a relatively slow rate while when fluid under pressure is supplied to said working chamber and said valve means is in said open position thereof said one member will move at a relatively fast rate; second cylinder-and-piston means including a cylinder member and a piston member therein, said latter member defining a working chamber and said second cylinder-and-piston means cooperating with said valve means for releasably maintaining the same in said closed position thereof, said working chamber of said second cylinder-and-piston means communicating with said return chamber upstream of said valve means and said working chamber of said second cylinder-and-piston means having an effective area greater than the effective area receiving the pressure of the fluid in said return chamber and urging said valve means to said open position from said closed position thereof, whereby said second cylinder-and-piston means will maintain said valve means in said closed position irrespective of the pressure in said return chamber; and means cooperating with said working chamber of said second cylinder-and-piston means for placing said working chamber in communication with said low pressure discharge conduit means so that the pressure of said return chamber will then suddenly thrust said valve from said closed to said open position thereof to provide free communication between said return chamber and said low pressure discharge conduit means, whereby the fluid under pressure in said working chamber of said first cylinder-and-piston means will move said one member suddenly at a faster rate of speed.

6. In a control apparatus for a machine, such as a welding machine, requiring initially a relatively slow feed and then a sudden rapid feed, in combination, a working cylinder and a working piston slidable therein, said piston defining in said cylinder a working chamber on one side of said piston and a return chamber on the other side of said piston; a main discharge conduit communicating with said return chamber of said working cylinder; low pressure discharge conduit means communicating with said main discharge conduit; high pressure discharge conduit means communicating with said main discharge conduit upstream of said low pressure discharge conduit; valve means movable between closed and open positions and having a closed position cutting out communication between said main discharge conduit and said low pressure discharge conduit means; a control cylinder and a control piston slidable therein, said control piston being operatively connected to said valve means and said control piston and control cylinder defining a working chamber which when it receives fluid under pressure acts on said control piston to urge said valve means to said closed position thereof, the effective area of said working chamber of said control cylinder and said control piston being greater than the effective area of said valve means acted upon by the pressure of the fluid in said main discharge conduit for urging said valve means to said open position thereof; conduit means providing communication between said working chamber of said control cylinder and said main discharge conduit upstream of said valve means so that the latter is reliably maintained in said closed position thereof; and additional valve means cooperating with said low pressure discharge conduit means and with said conduit means which communicates with said working chamber of said control cylinder for placing the latter conduit means in communication with said low pressure discharge conduit means and out of communication with said main discharge conduit so that the pressure in the latter will then act on said valve means to suddenly thrust the same from said closed to said open position so as to place said return chamber through said main discharge conduit in communication with said low pressure discharge conduit means to provide a rapid advance of said working piston by fluid under pressure in said working chamber defined between said working piston and working cylinder.

References Cited in the file of this patent

UNITED STATES PATENTS

| | | |
|---|---|---|
| 2,674,138 | Mize | Apr. 6, 1954 |
| 2,780,204 | Barley | Feb. 5, 1957 |